US011833671B2

(12) United States Patent
Tanaka

(10) Patent No.: US 11,833,671 B2
(45) Date of Patent: Dec. 5, 2023

(54) JOINT STRUCTURE FOR ROBOT

(71) Applicant: OMRON Corporation, Kyoto (JP)

(72) Inventor: Kazutoshi Tanaka, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/000,002

(22) PCT Filed: May 20, 2021

(86) PCT No.: PCT/JP2021/019118
§ 371 (c)(1),
(2) Date: Nov. 28, 2022

(87) PCT Pub. No.: WO2022/004177
PCT Pub. Date: Jan. 6, 2022

(65) Prior Publication Data

US 2023/0202056 A1 Jun. 29, 2023

(30) Foreign Application Priority Data

Jun. 29, 2020 (JP) ................................ 2020-111710

(51) Int. Cl.
*B25J 17/02* (2006.01)
*B25J 9/14* (2006.01)
*B25J 19/00* (2006.01)

(52) U.S. Cl.
CPC ............ *B25J 17/0216* (2013.01); *B25J 9/14* (2013.01); *B25J 19/0016* (2013.01)

(58) Field of Classification Search
CPC ....... B25J 9/14; B25J 17/0216; B25J 19/0016
See application file for complete search history.

(56) References Cited

U.S. PATENT DOCUMENTS 3,295,224 A * 1/1967 Cappel .................... B23Q 1/48 248/163.1
6,431,019 B1 * 8/2002 Greene .................... B25J 9/104 89/1.1

(Continued)

FOREIGN PATENT DOCUMENTS

JP H05192892 A 8/1993
JP H08118281 A 5/1996

(Continued)

OTHER PUBLICATIONS

International Search Report issued in Intl. Appln. No. PCT/JP2021/019118 dated Aug. 3, 2021. English translation provided.

(Continued)

*Primary Examiner* — William C Joyce
(74) *Attorney, Agent, or Firm* — ROSSI, KIMMS & McDOWELL LLP

(57) ABSTRACT

A joint structure for connecting a first element and a second element included in a robot includes a Stewart platform that controls a position and/or an angle of the second element relative to the first element. The Stewart platform includes a first member to be joined to the first element, a second member to be joined to the second element, multiple legs connecting the first member and the second member, a driver that changes an effective length of each of the legs to change a position and/or an angle of the second member relative to the first member, and a soft structure that elastically changes the effective length of each of the legs in response to an external force applied to the second member and restores the effective length of each of the legs in response to the external force being removed.

7 Claims, 8 Drawing Sheets

(56) References Cited

U.S. PATENT DOCUMENTS

| | | | | |
|---|---|---|---|---|
| 2006/0235571 | A1* | 10/2006 | Baba | A61L 27/58 700/254 |
| 2015/0264262 | A1* | 9/2015 | McClatchie | H04N 23/68 348/208.99 |
| 2018/0355892 | A1* | 12/2018 | Yamada | F15B 11/064 |
| 2022/0194246 | A1* | 6/2022 | Van Der Weijde | B25J 17/0216 |

FOREIGN PATENT DOCUMENTS

| | | | |
|---|---|---|---|
| JP | H08281581 | A | 10/1996 |
| JP | 2009006415 | A | 1/2009 |
| JP | 2009107030 | A | 5/2009 |
| WO | WO2020/222640 | * | 11/2020 |

OTHER PUBLICATIONS

Written Opinion issued in Intl. Appln. No. PCT/JP2021/019118 dated Aug. 3, 2021. English translation provided.

* cited by examiner

JOINT STRUCTURE FOR ROBOT

TECHNICAL FIELD

The present invention relates to a joint structure for a robot, and more particularly, to a joint structure for a manipulator in a soft robot (flexible robot).

BACKGROUND

An industrial robot typically includes a manipulator with a highly rigid structure and controls the three-dimensional (3D) position of an end effector while measuring the state with sensors. However, a robot simply with a highly rigid structure cannot perform certain operations, such as an operation including contact with an object and an operation involving precision higher than the measurement error of a sensor. In response to this, a known approach uses a soft robot (flexible robot). For example, a robot may partially include a flexible structure that can be displaced or deform under an external force and automatically follow the shape of an object. One such technique is a compliance control structure, examples of which are described in Patent Literatures 1 and 2.

CITATION LIST

Patent Literature

Patent Literature 1: Japanese Unexamined Patent Application Publication No. 5-192892

Patent Literature 2: Japanese Unexamined Patent Application Publication No. 8-118281

SUMMARY

Technical Problem

However, known compliance control structures described in Patent Literatures 1 and 2 have a small movable range with limited motions (small displacements in a horizontal plane) and thus have limited use environments or limited uses.

One or more aspects of the present invention are directed to a joint structure for a robot that can perform active control of multiple degrees of freedom and have flexibility.

Solution to Problem

A joint structure according to an aspect of the present disclosure is a joint structure for connecting a first element and a second element included in a manipulator for a robot. The joint structure includes a Stewart platform that controls at least one of a position or an angle of the second element relative to the first element. The Stewart platform includes a first member to be joined to the first element, a second member to be joined to the second element, a plurality of legs connecting the first member and the second member, a driver that changes an effective length of each of the plurality of legs to change at least one of a position or an angle of the second member relative to the first member, and a soft structure that elastically changes the effective length of each of the plurality of legs in response to an external force applied to the second member and restores the effective length of each of the plurality of legs in response to the external force being removed.

The first element may be a link between joints of the manipulator. The second element may be a link nearer the end effector than the first element or may be the end effector. This structure allows active control with multiple degrees of freedom over at least one of the relative position or the relative angle between the first element and the second element by changing the effective length of each leg of the Stewart platform with the driver. In the robot under an external force, the effective length of each leg changes elastically, allowing at least one of the relative position or the relative angle between the first element and the second element to change passively in accordance with the external force. This structure achieves both active control with multiple degrees of freedom and flexibility.

The effective length of a leg herein refers to a distance from a connecting point between the first member and the leg to a connecting point between the second member and the leg. This applies to the effective length of a leg including multiple rods connected together or of a leg including a bent member.

Each of the plurality of legs may include a rod slidably supported by a support to change the effective length of a corresponding leg of the plurality of legs by sliding. The driver may include a wire-shaped member being flexible and attached to the rod, and an elastic member elastically deformable in response to the wire-shaped member being pulled and the rod being slid. The elastic member may generate an elastic restoring force against a pulling force on the wire-shaped member. In this structure, the rod slides and the elastic member gradually deforms elastically under the pulling force being applied to the wire-shaped member. The rod stops sliding when an equilibrium is achieved between the pulling force and the elastic restoring force. In this structure, the sliding of the rod can be easily and precisely controlled by adjusting the pulling force applied to the wire-shaped member. The effective length of a single leg may be determined either by the sliding of the rod in the leg alone or by the sliding of the rods in all the legs, depending on the specific structure of the Stewart platform. In either case, the effective length of each leg can be precisely controlled by precisely controlling the sliding of each rod.

In the above structure, the elastic member may serve as the soft structure. When, for example, an external force acts in the same direction as the pulling force on the wire-shaped member, the resultant of the pulling force and the external force further deforms the elastic member, thus changing the sliding of the rod and changing the effective length of the leg. Once the external force is removed, the sliding of the rod returns to the position at which an equilibrium is achieved with the pulling force. In this manner, the same component can serve as both the driver and the soft structure to reduce the number of components and to reduce the cost and miniaturize the device.

The elastic member may include a nonlinear spring element. The soft structure may have stiffness variable by changing an amount of deformation of the elastic member in response to an amount of pulling of the wire-shaped member. This further allows control of the stiffness (softness) of the joint structure.

The support may be a bearing in the first member. This can simplify the structure of each leg.

The support may be a cylinder included in each of the plurality of legs. The cylinder may receive the rod placed in a slidable manner. This can simplify the structures of the first member and the second member.

The wire-shaped member may have an end located outside the joint structure to be connected to a drive source separate from the joint structure. In this manner, the drive source for the wire-shaped member separate from the joint structure is located outside the joint structure, allowing the joint structure to be compact and lightweight.

The leg may include a rod that changes the effective length of the leg by moving in a length direction. The driver may include an actuator that moves the rod in the length direction with compressible fluid. This structure easily and precisely controls the rod displacement by controlling the supply and discharge of the compressible fluid.

The compressible fluid for the actuator may serve as the soft structure. When, for example, an external force acts in the direction of pushing in the rod, the compressible fluid inside the actuator compresses or expands elastically, thus changing the displacement of the rod. Once the external force is removed, the compressed or expanded compressible fluid returns to the previous state, and the displacement of the rod also returns to the previous state. In this manner, the same component can serve as both the driver and the soft structure to reduce the number of components and to reduce the cost and miniaturize the device.

The actuator may be an air cylinder.

The joint structure may further include a tube to supply and discharge the compressible fluid to and from the actuator extending outside the joint structure. The tube may be connectable to a drive source separate from the joint structure. In this manner, the drive source for the actuator separate from the joint structure is located outside the joint structure, allowing the joint structure to be compact and lightweight.

The joint structure may further include a lock structure switchable between a free state with the second element being free to move independently of the first element and a locked state with the second element being locked to the first element. In the locked state, the first element and the second element act as a single rigid body. This allows the structure to switch between serving as a rigid robot (locked state) and serving as a soft robot (free state) as appropriate for an intended robot operation or environment, thus expanding the applicable range of the robot and allowing an efficient operation of the robot.

One or more aspects of the present invention may be directed to a joint structure for a robot, or an actuator that controls the position and the angle of a component of a manipulator for a robot including at least one of the above elements. One or more aspects of the present invention may be directed to a manipulator for a robot with the joint structure or an actuator, or may be such a robot. One or more aspects of the present invention may be directed to a control method or a drive method for controlling the position and the angle of a component of a robot manipulator using the joint structure described above. The above elements may be combined with one another in any possible manner in one or more aspects of the present invention.

Advantageous Effects

The joint structure for a robot according to the above aspects of the present invention can perform active control of multiple degrees of freedom and have flexibility.

DESCRIPTION OF EMBODIMENTS

Example Use

Figure 1A:
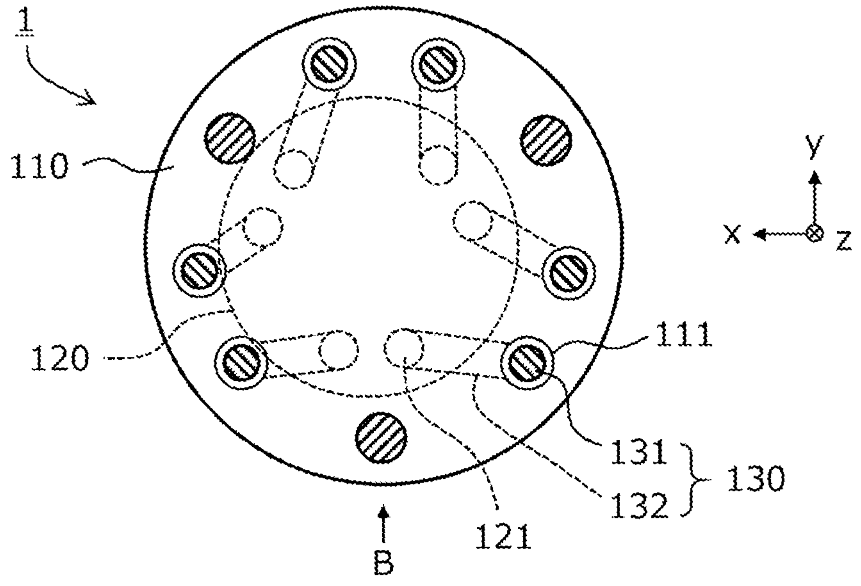
FIGS. 1A and 1B are schematic diagrams of a joint structure with a Stewart platform.
Figure 1B:
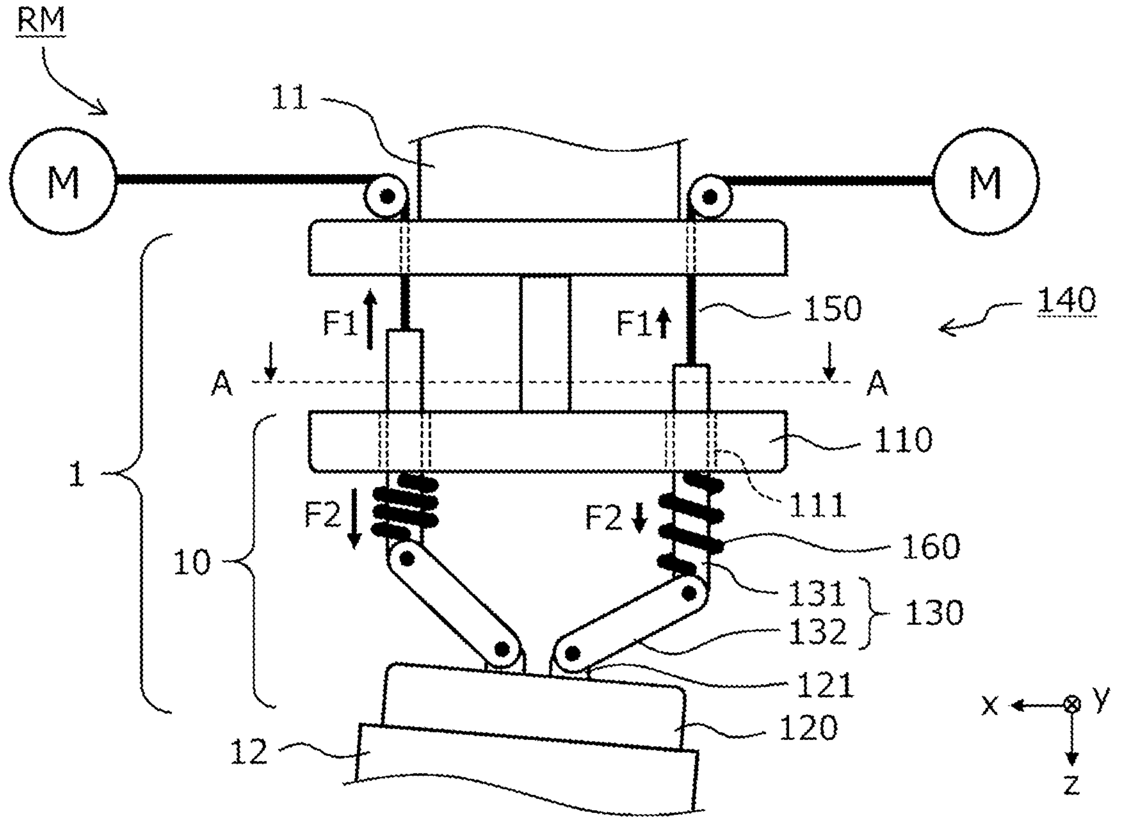

One example use of the present invention will now be described with reference to FIGS. 1A and 1B. FIGS. 1A and 1B are schematic diagrams of a robot joint structure with a Stewart platform. FIG. 1A is a cross-sectional view taken along line A-A in FIG. 1B. FIG. 1B is a side view (as viewed in the direction indicated by arrow B in FIG. 1A).

A joint structure 1 is used to connect a first element 11 and a second element 12 included in a manipulator RM for a robot. The manipulator RM is an articulated manipulator. The manipulator RM includes the first element 11 nearer its basal end, and the second element 12 nearer its distal end than the first element 11.

The joint structure 1 includes a Stewart platform 10 that can control at least one of the position or the angle of the second element 12 relative to the first element 11. The Stewart platform includes multiple legs for supporting a single member. The single member is moved with six degrees of freedom of motion, or specifically, translation in x- y-, and z-directions and rotation about x, y, and z axes, by changing the effective length of each leg (by changing the combination of the effective lengths of the legs). The Stewart platform is also called a motion base, a 6-axis platform, or a 6-degree of freedom (DOF) platform.

The Stewart platform 10 mainly includes a first member 110 joined to the first element 11, a second member 120 joined to the second element 12, multiple legs 130 connecting the first member 110 and the second member 120, and a driver 140 that changes the effective length of each leg 130. The legs 130 are typically six legs, but may be another number of legs.

In the example of FIG. 1B, each leg 130 includes two rods 131 and 132 connected to each other in a bendable manner. The rod 131 is supported by a bearing 111 in the first member 110. The rod 132 is connected to the second member 120 with a universal joint 121.

A flexible wire-shaped member 150 is attached to an upper end of the rod 131. The wire-shaped member 150 extends outside the joint structure 1 for connection to a drive source M. An elastic member 160 is located concentrically with the rod 131. In the example structure shown in FIGS. 1A and 1B, the wire-shaped member 150 and the elastic member 160 are included in the driver 140 for the legs 130.

The operation of the driver 140 will now be described. When a pulling force F1 is applied to the wire-shaped member 150 with the drive source M, the rod 131 slides upward in FIG. 1B, and the elastic member 160 gradually deforms elastically (by compression deformation). Once an equilibrium is achieved between the pulling force F1 and the elastic restoring force F2 from the elastic member 160, the rod 131 stops sliding to stabilize the effective length of the leg 130. In this structure, the effective length of each leg 130 can be controlled easily and precisely by adjusting the pulling force applied to the wire-shaped member 150 with the drive source M. During the operation of the robot, the orientation (position and angle) of the second member 120 can be controlled as intended by controlling the drive source M with a controller (not shown) to adjust the effective length of each leg 130. In the example of FIG. 1B, the pulling force F1 on the left leg 130 is greater than the pulling force F1 on the right leg 130. In this structure, the left leg 130 is shorter than the right leg 130, and the second member 120 rotates about the y axis.

Figure 2:
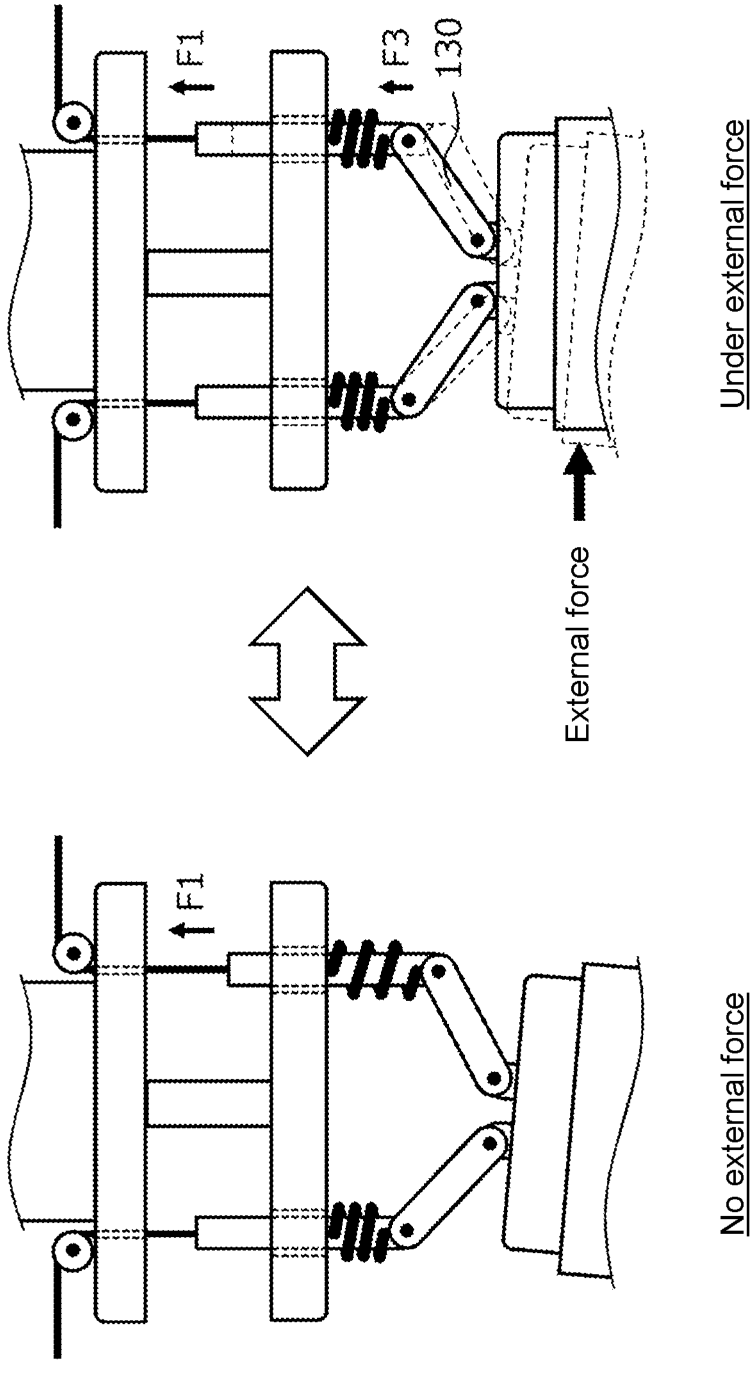
FIG. 2 is a diagram describing motions under an external force being applied.

The elastic member 160 also serves as a flexible, or a soft structure that elastically changes the effective length of the leg 130 under an external force on the second member 120 (second element 12) and restores the effective length of the leg 130 when the external force is removed. For example, an external force acts on the second member 120 as shown in the right portion of FIG. 2, and the external force F3 is applied in the direction to lift the right leg 130. In this case, the resultant of the pulling force F1 and the external force F3 further compresses and deforms the elastic member 160, shortening the effective length of the right leg 130. This allows at least one of the relative position or the relative angle between the first element 11 and the second element 12 to passively change in accordance with the external force. Once the external force F3 is removed, as shown in the left portion of FIG. 2, the effective length of the leg 130 returns to a length corresponding to the position at which an equilibrium is achieved with the pulling force F1.

The drive source M may be a linear motor or a rotary motor. The drive source M may be driven electrically or by fluid pressure. Instead of applying the pulling force F1 to the wire-shaped member 150, the drive source M may drive the wire-shaped member 150 to determine the length of retraction of the wire-shaped member 150. In this case, the rod 131 stops at a position corresponding to the retracted length of the wire-shaped member 150 and is urged by the elastic restoring force F2 from the elastic member 160. Under an external force applied to the rod 131 that compresses the elastic member 160 exceeding the elastic restoring force F2, the rod 131 moves until an equilibrium is achieved between the elastic restoring force F2, which increases as the elastic member 160 is compressed, and the external force. This causes the wire-shaped member 150, which is positioned in the length direction with the drive motor M, to deflect in response to the displacement of the rod 131. The deflection occurs mainly in a portion of the wire-shaped member 150 not extending through a tube (described later).

The joint structure 1 described above can achieve both active control with multiple degrees of freedom and flexibility.

EMBODIMENTS

Figure 3:
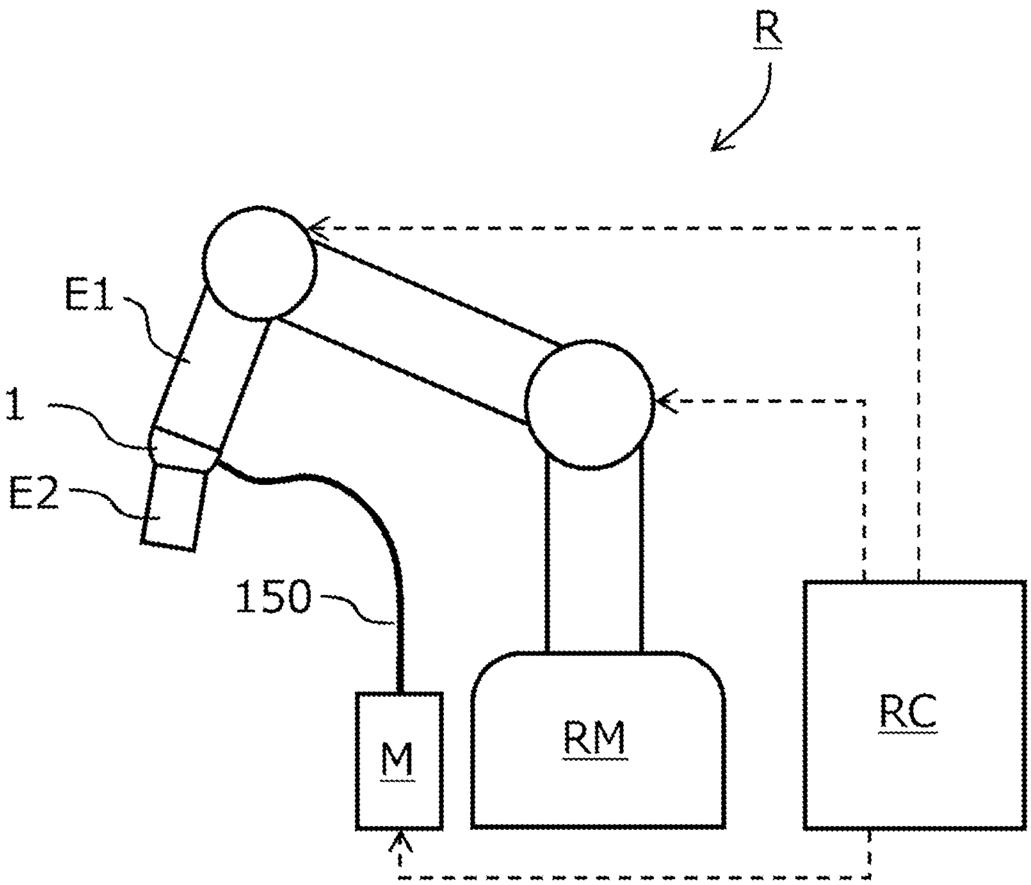
FIG. 3 is a schematic diagram of a robot showing its overall structure.

A robot and a joint structure for the robot according to one or more embodiments of the present invention will be described with reference to FIG. 3. FIG. 3 is a schematic diagram of the robot, showing its overall structure.

In the present embodiment, the manipulator RM in a vertically articulated robot R includes an end effector E2 with the joint structure 1 including the Stewart platform. However, this is a mere example, and the structure and the type of the robot R are not limited to the example of FIG. 3. More specifically, the robot R may be any robot including at least one manipulator, and is applicable to various types of robots, including an industrial robot, a humanoid robot, a nursing care robot, a transport robot, a household robot, and a surgical support robot, among which the industrial robot is an appropriate example to include the joint structure 1. The industrial robot may be, for example, a selective compliance structure robot arm (SCARA) robot, a parallel link robot, or a Cartesian coordinate robot, in addition to the above vertically articulated robot. The joint structure 1 may be installed at a position not limited to the connection of the end effector E2, but may be a connection between the links.

The robot R in the present embodiment includes, as its main components, the manipulator RM, a controller RC, and the drive source M. The manipulator RM is an articulated manipulator including multiple links and joints that connect the links each other. The manipulator RM is driven by a servo motor. The controller RC controls the servo motor included in the manipulator RM and the drive source M.

The end effector E2 is connected to a link E1 at the distal end of the manipulator RM with the joint structure 1. In the present embodiment, the link E1 corresponds to the first element 11 in FIG. 1B, and the end effector E2 corresponds to the second element 12 in FIG. 1B. The drive source M drives the driver 140 for the Stewart platform in the joint structure 1. The drive source M may be of any type and with any structure that can pull and feed the wire-shaped member 150, but is to have a pulling force to change the effective length of the leg 130 against the elastic restoring force from the elastic member 160 and to stroke and allow a sufficient movable range of the Stewart platform and the end effector E2. The drive source M may be, for example, a motor, a hydraulic actuator, or a pneumatic actuator. Separate drive sources M may be used for the respective legs 130.

Figure 4:
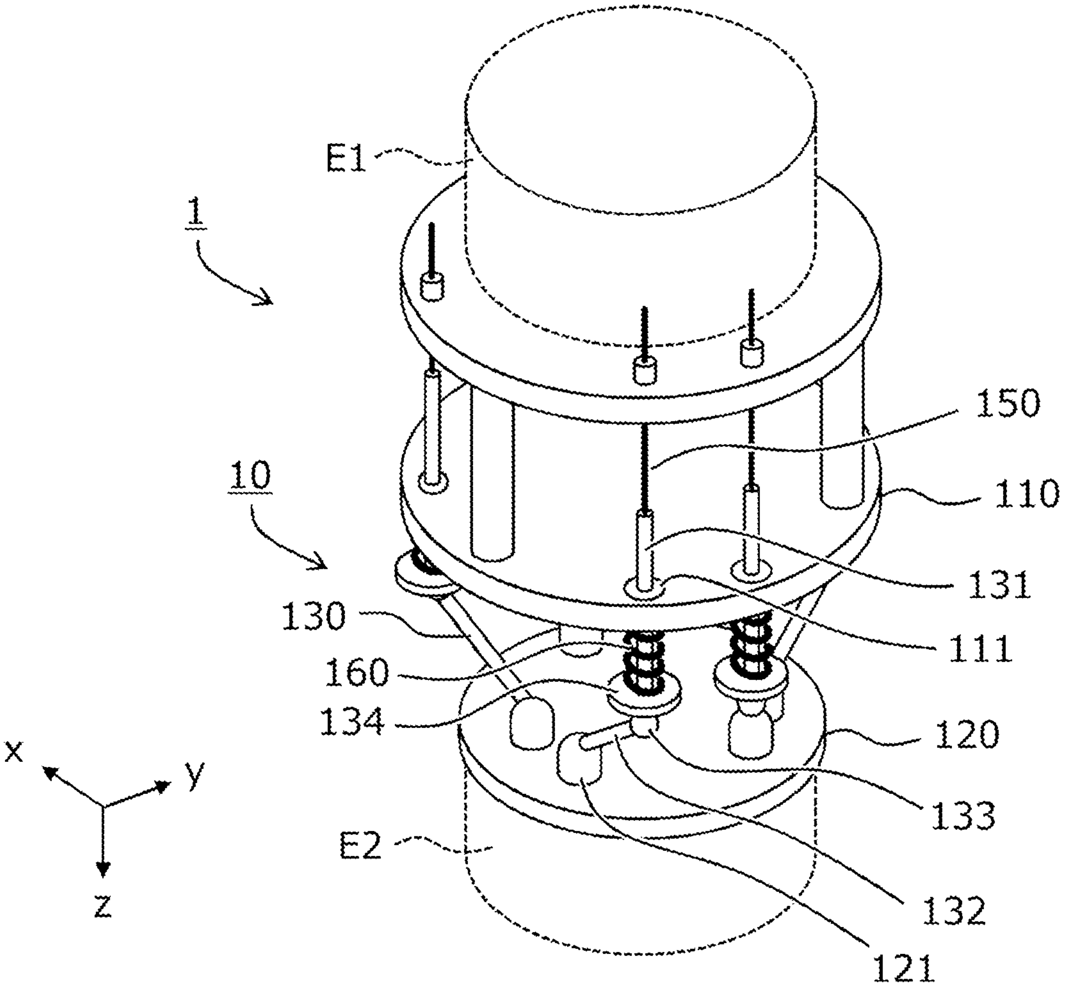
FIG. 4 is a perspective view of the joint structure.
Figure 5A:
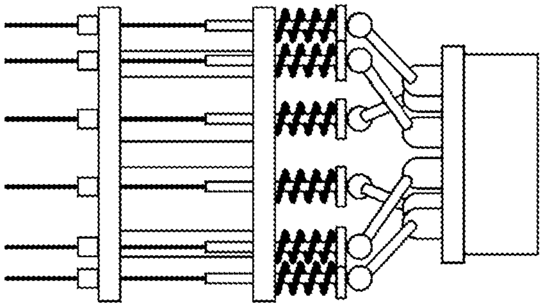
FIG. 5A is a side view of the joint structure (home position)
Figure 5B:
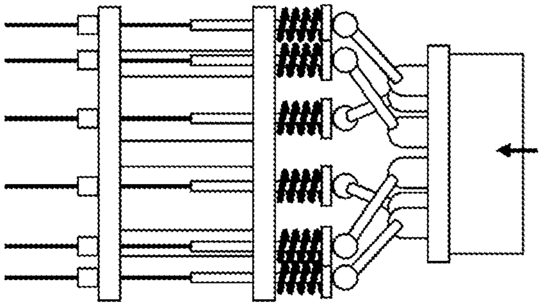
FIG. 5B is a side view of the joint structure (z translation)
Figure 5C:
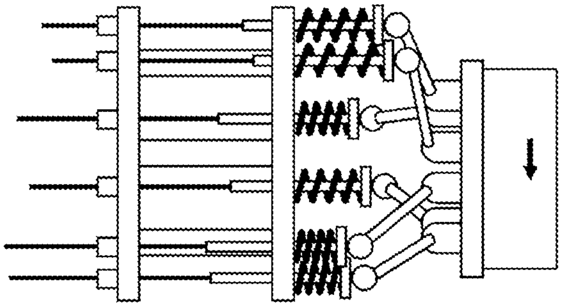
FIG. 5C is a side view of the joint structure (x translation)

FIGS. 4 and 5A to 5D show the joint structure 1 in detail. FIG. 4 is a perspective view of the joint structure 1. FIG. 5A is a side view of the joint structure 1 (home position). FIG. 5B is a side view of the joint structure 1 (z translation). FIG. 5C is a side view of the joint structure 1 (x translation). FIG. is a side view of the joint structure 1 (rotation). Hereafter, the xyz coordinate system is defined for the joint structure 1 to have the normal of the first member 110 (or the axis direction of the link E1) to be the z axis.

The joint structure 1 can perform active control of the 6-DOF motion of the end effector E2 (translation in x-direction, y-direction, and z-direction, and rotation about the x, y, and z axes) with the Stewart platform 10.

The Stewart platform 10 includes the first member 110 being substantially a disk and the second member 120 being substantially a disk, which are connected by the six legs 130. The six legs 130 each have the same structure. Each leg 130 includes two rods 131 and 132 that are connected by a pin joint 133 in a bendable manner. The rod 131 nearer the basal end is supported by the sliding bearing 111 in a through-hole in the first member 110 to be slidable in z-direction and rotatable about the z axis. The rod 132 nearer the distal end is connected to the second member 120 with the universal joint 121 and is rotatable in any direction relative to the second member 120. A ball joint may be used to connect the rod 132 to the second member 120.

The flexible wire-shaped member 150 is attached at the end of the basal end of the rod 131. In the present embodiment, a metal wire is used as the wire-shaped member 150. A cable (a rope) formed from chemical or natural fibers may also be used as the wire-shaped member 150. The wire-shaped member 150 extends outside the joint structure 1 for connection to the drive source M. The path of the wire-shaped member 150 between the joint structure 1 and the drive source M includes at least a curved portion of the wire-shaped member 150 extending through a non-stretchable tube (not shown) having two ends at fixed positions. When the wire-shaped member 150 is under a pulling force, the wire-shaped member 150 at the joint structure 1 is displaced in response to the displacement of the wire-shaped member 150 at the drive source M.

The elastic member 160 is located concentrically with the rod 131 between a flange 134 at the lower end of the rod 131 (at the end nearer the pin joint 133) and the first member 110. In the present embodiment, a coil spring (compression spring) is used as the elastic member 160.

The controller RC calculates a target effective length for the six legs 130 and the control quantity corresponding to the target effective length (e.g., the pulling force or the pulling amount) based on the target orientation of the second member 120 (the position and the angle relative to the first member 110). Once the controller RC controls the drive source M to individually adjust the effective length of the six legs 130, the second member 120 has the target orientation (position and angle).

Figure 5D:
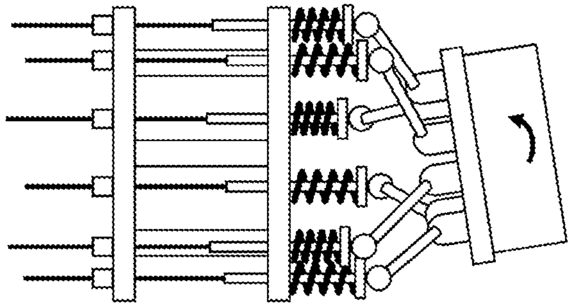
FIG. 5D is a side view of the joint structure (rotation).

The effective lengths of the six 130 legs are referred to as LL1 to LL6, the maximum effective length as LLmax, and the minimum effective length as LLmin. In FIG. 5A, LL1=LL2=LL3=LL4=LL5=LL6=LLmax. In other words, all the six legs 130 are set to have the maximum effective length LLmax. In this case, the second member 120 is displaced in the xy plane by 0 mm (specifically with the xy-coordinates of the center of the second member 120 of (0,0)) and the second member 120 rotates by 0 degrees. This is a reference state (home position). As shown in FIG. 5B, the wire-shaped members 150 of the six legs 130 are pulled by the same amount when the effective lengths remain LL1=LL2=LL3=LL4=LL5=LL6. In this case, the second member 120 translates in z-direction while remaining parallel to the xy plane. When the effective lengths of the legs LL1 to LL6 are adjusted individually, the second member 120 can also translate in x-direction or y-direction as shown in FIG. 5C, or rotates as shown in FIG. 5D. The states shown in FIGS. 5A to 5D may also be combined, thus achieving active 6-DOF control.

In addition to the active control described above, the joint structure 1 according to the present embodiment can also perform passive motions that follow an external force. In the state shown in FIG. 5A, for example, the second member 120 may receive a force applied in z-direction (upward in the figure). In this case, the six legs 130 are lifted when the effective lengths remain LL1=LL2=LL3=LL4=LL5=LL6. The second member 120 can thus be displaced in z-direction as shown in FIG. 5B. In the state shown in FIG. 5B, the second member 120 may receive a force applied in x-direction (leftward in FIG. 5B) to change the effective length of each leg 130 accordingly. The second member 120 can be displaced in x-direction as shown in FIG. 5C. In the state shown in FIG. 5B, the second member 120 may receive a moment to rotate the second member 120 as shown in FIG. 5D. Once the external force is removed, the effective length of each leg 130 returns to the previous state under the restoring force from the elastic member 160, and the orientation (position and angle) of the second member 120 also returns to the previous state (the previous state refers to the effective length or orientation determined through active control by the driver 140). This soft structure allows the end effector E2 to move freely independently of the link E1, thus achieving a soft robot.

In the joint structure 1 according to the present embodiment, all the wire-shaped members 150 may be pulled up with a force sufficiently greater than the elastic restoring force from the elastic members 160. The elastic members 160 are then completely collapsed to lock the position of the rods 131. In this case, LL1=LL2=LL3=LL4=LL5=LL6=LLmin. In other words, all the six legs 130 have the minimum effective length LLmin. In this state, the second member 120 does not move easily under an external force acting on the second member 120. In other words, the soft structure described above is disabled, causing the link E1 and the end effector E2 to act as a single rigid body. This structure serves as a lock structure that allows switching between a free state in which the end effector E2 is free to move independently of the link E1 and a locked state in which the end effector E2 is locked to the link E1.

In this structure, active control with multiple degrees of freedom of the relative position and the relative angle between the link E1 (first element) and the end effector E2 (second element) can be achieved by changing the effective length of each leg 130 in the Stewart platform 10 with the driver 140. In the robot R under an external force, the effective length of each leg 130 changes elastically, causing at least one of the relative position or the relative angle between the link E1 and the end effector E2 changes passively in accordance with the external force. This structure achieves both active control with multiple degrees of freedom and flexibility.

In the driver 140 in the present embodiment, the sliding of the rod 131 stops and the effective length of the leg 130 is stabilized when an equilibrium is achieved between the pulling force on the wire-shaped member 150 and the elastic restoring force from the elastic member 160. In this structure, the effective length of the leg 130 can be controlled easily and precisely by adjusting the pulling force applied to the wire-shaped member 150.

In the present embodiment, the drive source M for the wire-shaped member 150 separate from the joint structure 1 is located outside the joint structure 1, allowing the joint structure 1 to be compact and lightweight.

The joint structure 1 according to the present embodiment serves as the lock structure that allows switching between a rigid robot (locked state) and a flexible robot (free state). For example, the structure can be used as appropriate for an intended robot operation or environment, thus expanding the applicable range of the robot and allowing an efficient operation of the robot.

The joint structure 1 according to the present embodiment includes the driver 140 also serving as the soft structure and the lock structure. This structure reduces the number of components and reduces the cost and allows the equipment to be more compact.

<Modifications>

The embodiment described above is a mere example of the present invention. The present invention is not limited to the specific embodiment described above, but may be modified variously within the scope of the technical ideas of the invention.

Figure 6:
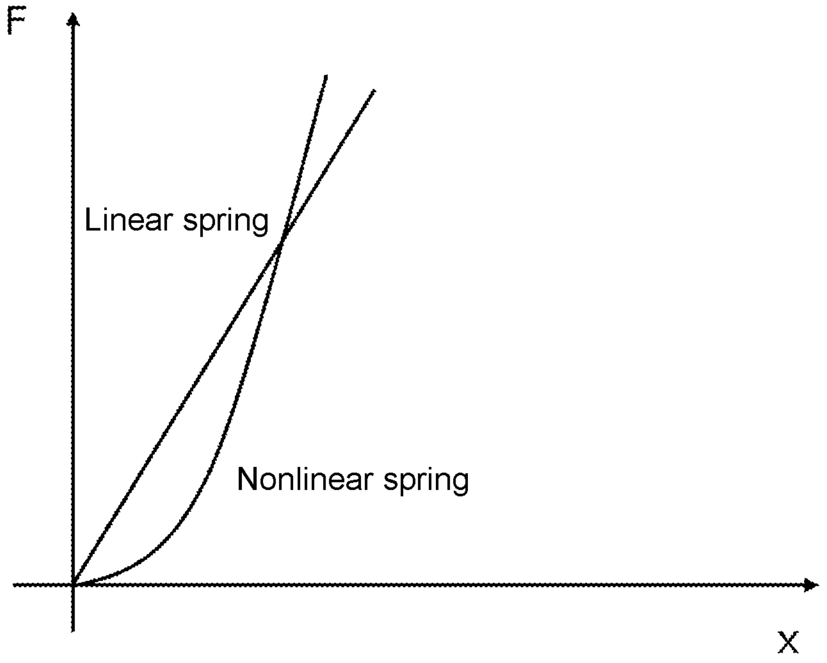
FIG. 6 is a graph showing the characteristics of nonlinear springs used in a first modification.

In a first modification, a nonlinear spring element is used as the elastic member 160. FIG. 6 is a graph showing the difference in characteristics between a linear spring and a nonlinear spring, with the horizontal axis representing displacement (deflection) and the vertical axis representing load. A linear spring has a direct proportional relationship between load and displacement, and has the stiffness (spring constant) constant independently of displacement. A nonlinear spring has the stiffness (spring constant) that increases as the displacement increases. Such nonlinear characteristics can be achieved using, for example, a coil spring with a nonuniform coil diameter, a coil spring with an unequally spaced pitch, or a coil spring with a nonuniform wire diameter.

For example, controlling the drive source M may allow switching in multiple levels of the amount of extension of the wire-shaped member 150 in the free state, such as s1, s2, and s3 mm (s1<s2<s3) to change the displacement of the elastic member 160. The stiffness (softness) of the joint structure 1 in the free state can thus be controlled. For example, the structure can be adjusted to have suitable stiffness (softness) as appropriate for an intended robot operation and environment, thus expanding the applicable range of the robot and allowing an efficient operation of the robot.

Figure 7:
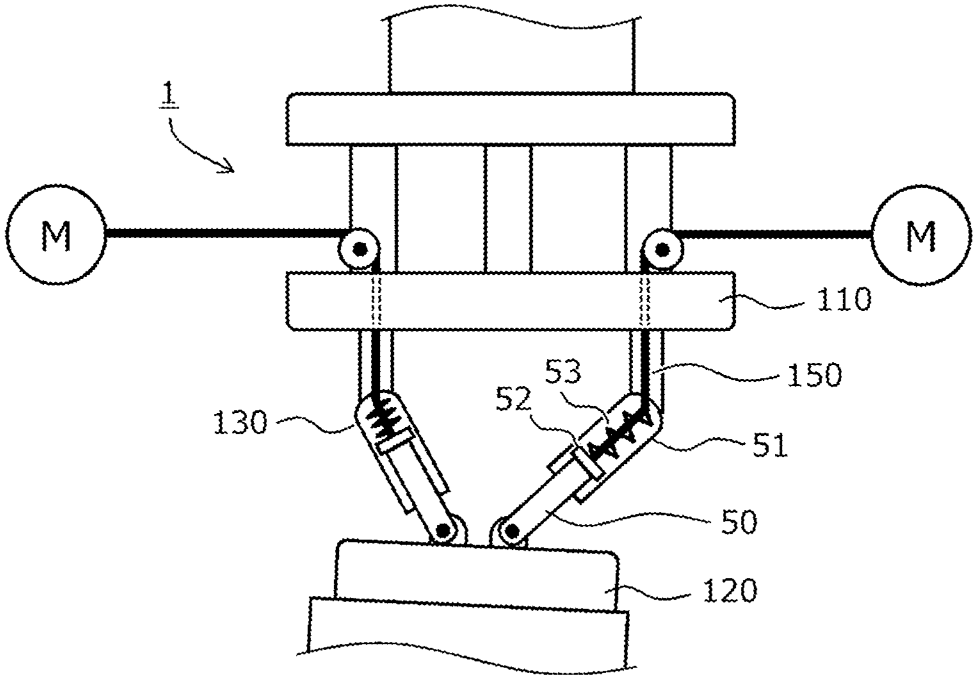
FIG. 7 is a diagram of a joint structure according to a second modification.

FIG. 7 shows a joint structure according to a second modification. The joint structure according to the second modification differs from the structure according to the above embodiment in the legs, the driver, and the soft structure. As shown in FIG. 7, each leg 130 includes a rod 50, a cylinder 51 into which the rod 50 is slidable, a piston 52 at an end of the rod 50, and an elastic member 53 accommodated in a space defined by the piston 52 and the cylinder 51. The connection between the legs 130 and the first member 110 and between the legs 130 and the second member 120 is achieved using universal joints or ball joints. The wire-shaped member 150 for driving the rod 50 is attached to the piston 52 and extends outside the joint structure 1 through the inside of the cylinder 51 and through a through-hole in the first member 110.

In this structure, the wire-shaped member 150 receives a pulling force applied to it with the drive source M. The rod 50 is then pulled into the cylinder 51 and the elastic member 53 gradually deforms elastically (by compression deformation). Once an equilibrium is achieved between the pulling force and the elastic restoring force from the elastic member 53, the rod 50 stops sliding to stabilize the effective length of the leg 130. This structure also allows the effective length of the leg 130 to be easily and precisely controlled by adjusting the pulling force applied to the wire-shaped member 150 with the drive source M. In this structure as well, the drive source M may drive the wire-shaped member 150 to determine the retraction length of the wire-shaped member 150.

The elastic member 53 also serves as the soft structure. For example, an external force may act in the same direction as the pulling force on the wire-shaped member 150. The resultant of the pulling force and the external force further compresses and deforms the elastic member 53, changing the effective length of the leg 130. Once the external force is removed, the effective length of the leg 130 returns to a length corresponding to the position at which an equilibrium is achieved with the pulling force or to the position corresponding to the determined retracted length of the wire-shaped member 150.

Figure 8:
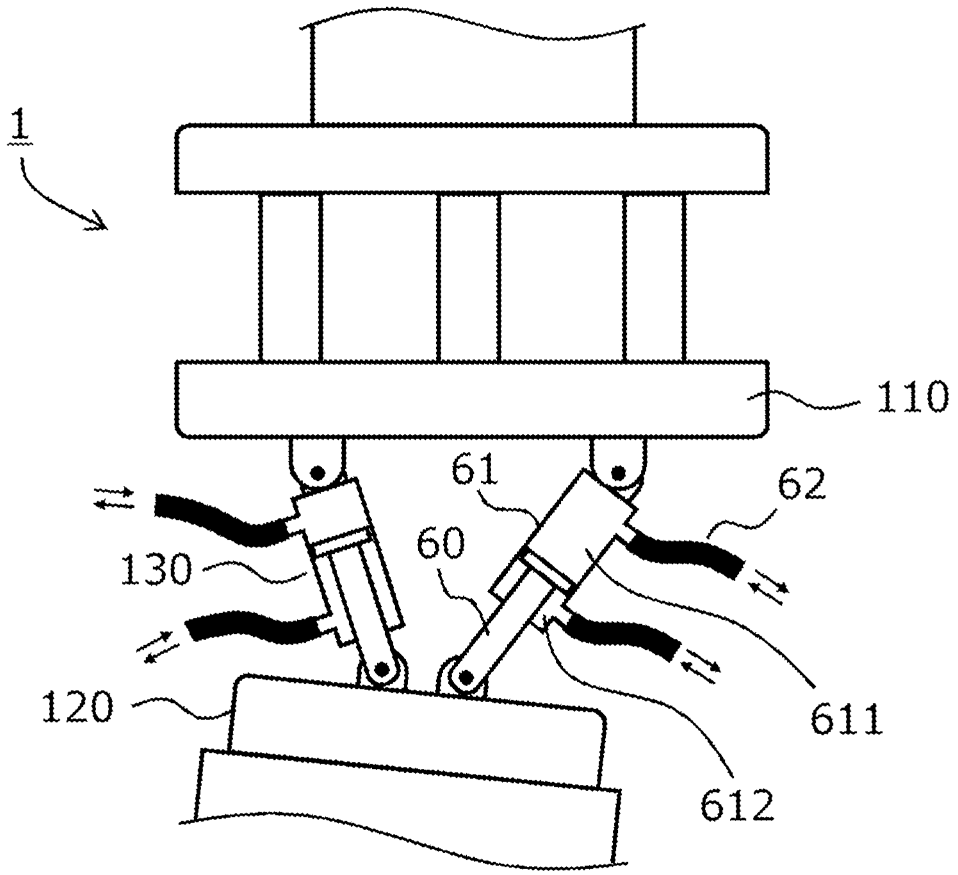
FIG. 8 is a diagram of a joint structure according to a third modification.

FIG. 8 shows a joint structure according to a third modification. The joint structure according to the third modification differs from the structure according to the above embodiment in the legs, the driver, and the soft structure. As shown in FIG. 8, each leg 130 includes a rod 60 and a pneumatic actuator (also referred to as an air cylinder) 61 that moves the rod 60 in the effective length direction of the leg 130. The connection between the legs 130 and the first member 110 and between the legs 130 and the second member 120 are achieved using universal joints.

The pneumatic actuator 61 includes two tubes 62 to supply and discharge compressible fluid (e.g., air) to the pneumatic actuator 61. The tubes 62 may extend outside the joint structure 1 and connected to a drive source M that is separate from the joint structure 1. In this manner, the drive source M for the actuator may be separate from the joint structure 1 and be located outside the joint structure 1. This allows the joint structure 1 to be compact and lightweight.

In this structure, when fluid is introduced into a first chamber 611 in the pneumatic actuator 61 with the drive source M (e.g., a compressor or a pump), the rod 60 moves toward a second chamber 612 under a differential pressure between the first chamber 611 and the second chamber 612. When fluid is introduced into the second chamber 612, the rod 60 moves toward the first chamber 611. The effective length of the leg 130 can thus be controlled easily and precisely.

In this structure, the compressible fluid in the pneumatic actuator 61 also serves as a soft structure. When, for example, an external force acts in the direction of pushing the rod 60, the compressible fluid inside the pneumatic actuator 61 elastically compresses or expands, changing the effective length of the leg 130. Once the external force is removed, the compressed or expanded compressible fluid returns to the previous state, and the effective length of the leg 130 returns to the previous state.

Figure 9:
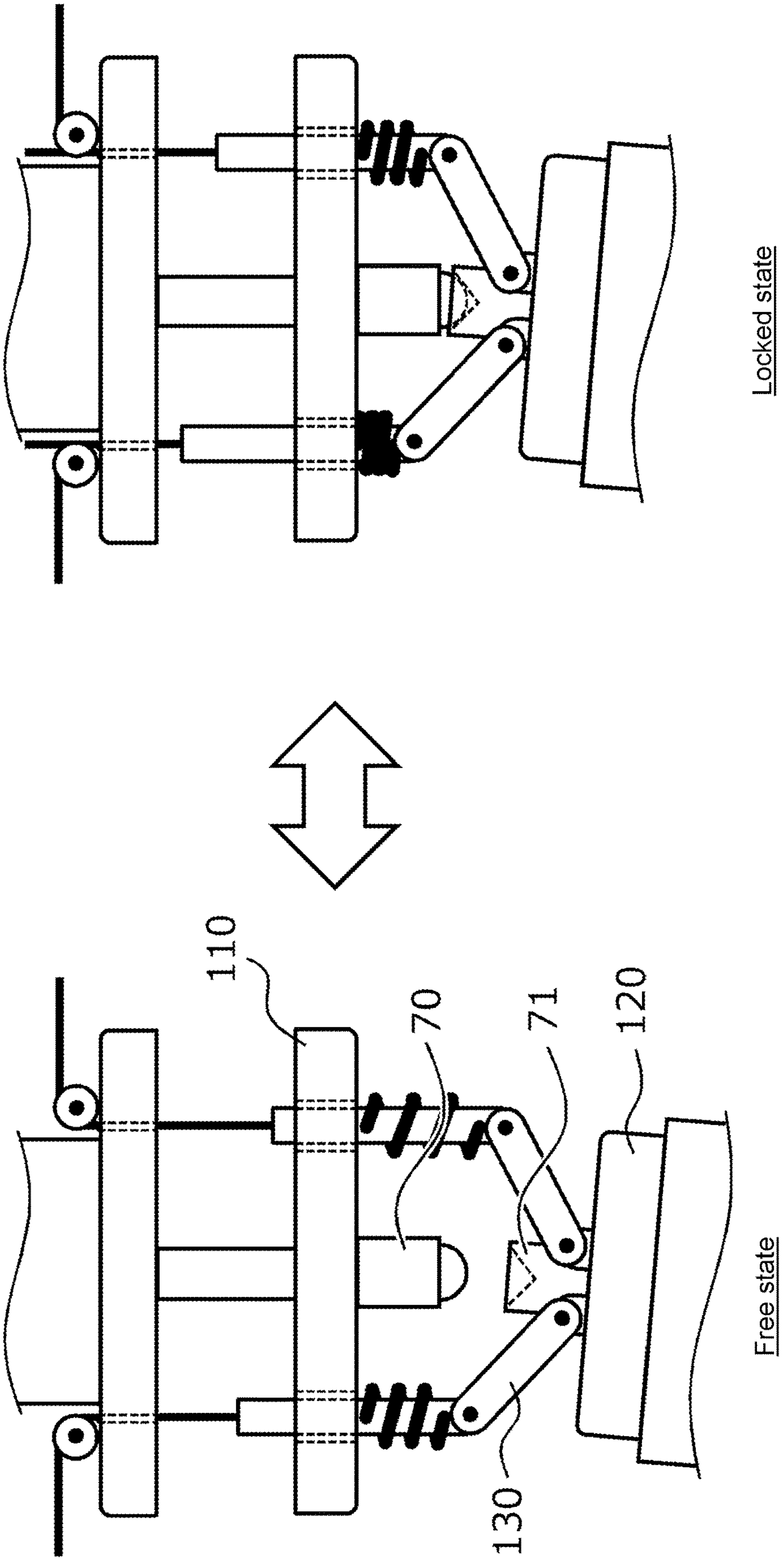
FIG. 9 is a diagram of a joint structure according to a fourth modification.

FIG. 9 shows a joint structure according to a fourth modification. The fourth modification is a modification of the lock structure. The lock structure mainly includes a first lock portion 70 on the first member 110 and a second lock portion 71 on the second member 120. The structure locks the first member 110 and the second member 120 together by shortening the effective lengths of the legs 130 and engaging the first lock portion 70 with the second lock portion 71.

One of the first lock portion 70 and the second lock portion 71 may include a protrusion, and the other of the first lock portion 70 and the second lock portion 71 may include a recess. The protrusion and the recess may be engageable with each other. Such engagement can increase the locking force in the locked state. The engagement also allows relative positioning between the first member 110 and the second member 120 in the locked state. In the example of FIG. 9, a hemispherical protrusion and a conical recess are included. This structure allows the protrusion and the recess to be in contact at any angle, allowing the second member 120 to be locked in an inclined orientation relative to the first member 110.

APPENDIX 1

(1) A joint structure (1) for connecting a first element (11) and a second element (12) included in a robot, the joint structure (1) comprising:

- a Stewart platform (10) configured to control at least one of a position or an angle of the second element (12) relative to the first element (11),
- the Stewart platform (10) including
- a first member (110) to be joined to the first element (11),
- a second member (120) to be joined to the second element (12),
- a plurality of legs (130) connecting the first member (110) and the second member (120),
- a driver (140) configured to change an effective length of each of the plurality of legs (130) to change at least one of a position or an angle of the second member (120) relative to the first member (110), and a soft structure (160) configured to elastically change the effective length of each of the plurality of legs (130) in response to an external force applied to the second member (120) and to restore the effective length of each of the plurality of legs (130) in response to the external force being removed.

REFERENCE SIGNS LIST

1 joint structure
10 Stewart platform
11 first element
12 second element
50 rod
51 cylinder
52 piston
53 elastic member
60 rod
61 actuator
62 tube
70 first lock portion
71 second lock portion
110 first member
111 bearing
120 second member
121 universal joint
130 leg
131 rod
132 rod
133 pin joint
134 flange
140 driver
150 wire-shaped member
160 elastic member
E1 link
E2 end effector
R robot
RM manipulator
RC controller
M drive source

The invention claimed is:

1. A joint structure for connecting a first element and a second element included in a manipulator for a robot, the joint structure comprising:

a Stewart platform configured to control at least one of a position or an angle of the second element relative to the first element, the Stewart platform including:

a first member to be joined to the first element, a second member to be joined to the second element, a plurality of legs connecting the first member and the second member, a driver configured to change an effective length of each leg of the plurality of legs to change at least one of a position or an angle of the second member relative to the first member, and a soft structure configured to elastically change the effective length of the each leg of the plurality of legs in response to an external force applied to the second member and to restore the effective length of the each leg of the plurality of legs in response to the external force being removed, wherein:

the each leg of the plurality of legs includes a rod slidably supported by a support to change the effective length of the each leg of the plurality of legs by sliding, and the driver includes:

a wire-shaped member being flexible and attached to the rod, and an elastic member elastically deformable in response to the wire-shaped member being pulled and the rod being slid, the elastic member being configured to generate an elastic restoring force against a pulling force on the wire-shaped member.

2. The joint structure according to claim 1, wherein the elastic member serves as the soft structure.

3. The joint structure according to claim 2, wherein the elastic member includes a nonlinear spring element, and the soft structure has stiffness variable by changing an amount of deformation of the elastic member in response to an amount of pulling of the wire-shaped member.

4. The joint structure according to claim 1, wherein the support is a bearing in the first member.

5. The joint structure according to claim 1, wherein the support is a cylinder included in the each leg of the plurality of legs, and the cylinder receives the rod placed in a slidable manner.

6. The joint structure according to claim 1, wherein the wire-shaped member has an end located outside the joint structure to be connected to a drive source separate from the joint structure.

7. The joint structure according to claim 1, further comprising:

a lock structure switchable between a free state with the second element being free to move independently of the first element and a locked state with the second element being locked to the first element.

* * * * *